March 11, 1958  C. O. FINN  2,825,983
DEVICES FOR REMOVING BRUSH AND SHRUBS AND CONDITIONING SOIL
Filed Feb. 6, 1956  2 Sheets-Sheet 1

INVENTOR.
CHARLES O. FINN
BY
Zugelter & Zugelter
Attys.

INVENTOR.
CHARLES O. FINN

United States Patent Office 2,825,983
Patented Mar. 11, 1958

2,825,983

DEVICES FOR REMOVING BRUSH AND SHRUBS AND CONDITIONING SOIL

Charles O. Finn, Cincinnati, Ohio, assignor to The Finn Equipment Company, Cincinnati, Ohio, a corporation of Ohio Application February 6, 1956, Serial No. 563,580

9 Claims. (Cl. 37—2)

This invention relates to brush and shrub removers and soil conditioners.

This application is a continuation-in-part of my copending application Serial No. 479,351, filed January 3, 1955, now abandoned.

In the construction of highways, the problem of clearing brush and wild shrubs from slopes along the side of the highways, and conditioning the soil for seeding, has been difficult and expensive.

It is an object of this invention to provide a relatively simple device that can be dragged by a tractor or truck, over the shrubbed and brushy banks and slopes along a highway and clear a swath of fifty to one hundred feet in width while at the same time harrowing and smoothing the soil on which the brush and shrubs stood.

Another object of the invention is to provide a device that comprises a relatively long heavy chain, the lead end of which can be connected to a vehicle such as a truck or tractor, which chain includes a plurality of predetermined lengths or sections of chain connected by swivels, one or more of the lengths between swivels being provided with harrow spikes or prongs, and the trailing end of the chain being provided with a relatively heavy wheel. The wheel is so constructed that when the chain and wheel are dragged by a vehicle the wheel will prevent the chain from straightening out behind the vehicle while clearing and harrowing a wide swath.

Another object of the invention is to provide a wheel having on one side of its rim a relatively sharp annular member or ring that will cut into the ground and maintain the chain in position to clear a wide swath, and a plurality of spikes or prongs spaced about the periphery of the wheel to cause it to turn and thereby provide positive rotational driving force to the chain.

Another object of the invention is to provide a wheel of the type set forth in the next preceding object, which can be adjustably counterweighted to provide the necessary reaction required to cause the wheel to roll on its rim and thereby keep the chain in a direction generally normal or transverse of the slope and the path of travel of the tractor or truck.

Other objects of the invention will in part be apparent and will in part be obvious to those of ordinary skill in the art to which the invention pertains, from the following description taken in conjunction with the accompanying drawings.

Figure 1:
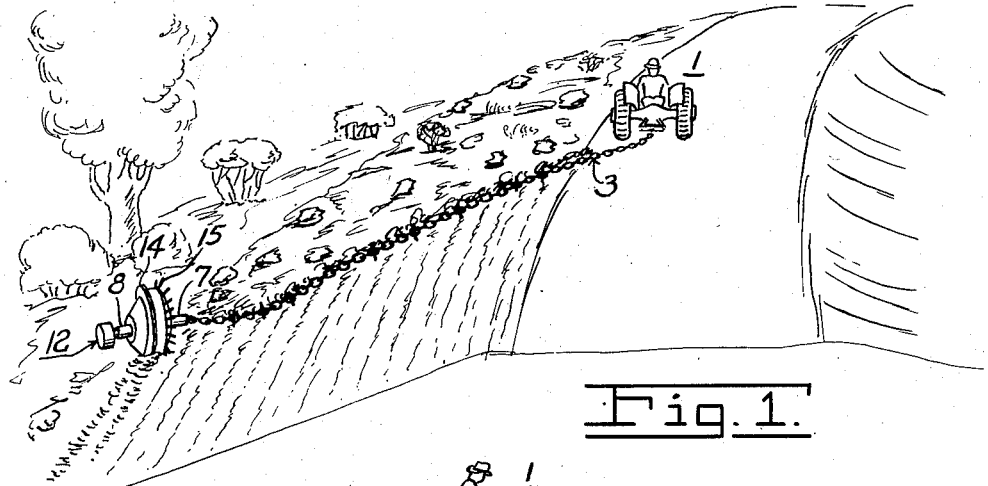
Figure 1 is a view of a soil conditioner embodying a form of the invention, being dragged by a tractor or motor vehicle over a slope to clear away brush and shrubs and at the same time harrow and smooth the ground for seeding.

In Fig. 1 of the drawings, a tractor 1 or other suitable vehicle, such as a truck for example, and a soil conditioner 2 dragged by the vehicle along a slope covered with brush and shrubbery, are shown. As illustrated, device 2 clears the bank of shrubbery and brush, harrows the soil and smooths it as the device is dragged over the slope.

The soil conditioner 2 comprises a chain 3, one end of which is adapted to be connected to vehicle 1, and a wheel 4 connected to the other or trailing end of the chain. The wheel 4 is preferably hollow and may conveniently be made from relatively heavy drumheads 5 having annular abutting flanges 6 that may be joined together by welding as shown.

The centers of the drumheads 5 are provided with tubular extensions or arms 7 and 8. The extension 7 is provided with a loop 9 to which a wheel coupling clevis 10 of the chain may be connected. Extension 8 as shown is hollow and provided with a telescoping member 11 having a counterweight 12 at its outer end. The counterweight may consist of a plurality of heavy disks 13, the number of which may be increased or decreased to adjust the magnitude of the weight. The counterweight may be moved inwardly or outwardly of extension 8, depending on the counterbalancing effect required, and it may be locked in place by a set screw 13'.

Figure 3:
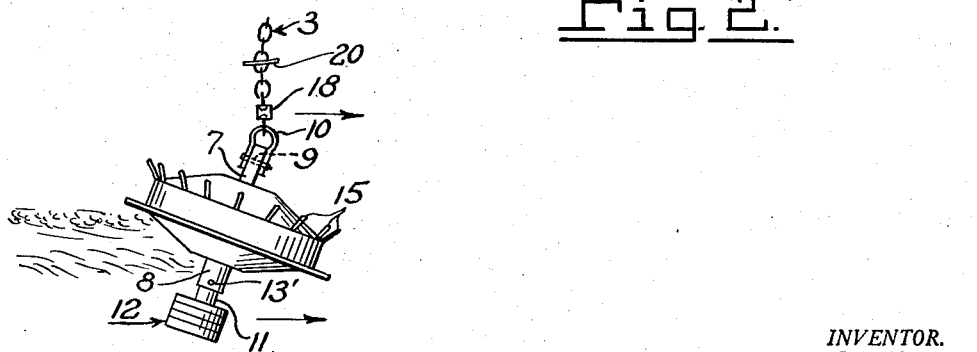
Fig. 3 is a top plan view of the wheel and a portion of the chain as viewed in the direction of arrows III—III of Fig. 2.
Figure 4:
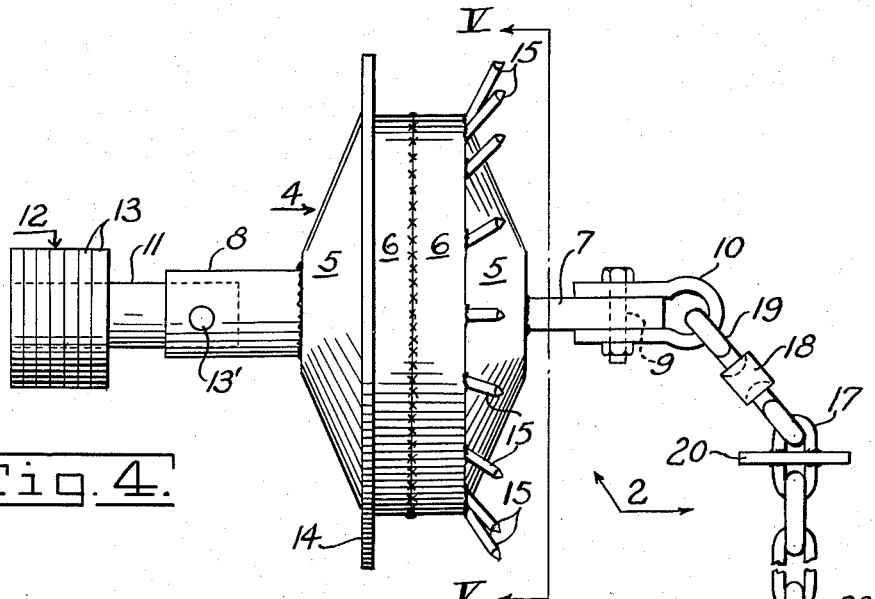
Fig. 4 is an enlarged view of a wheel embodied in the invention, and of the chain connected thereto, the latter being provided with swivels and harrow spikes.
Figure 5:
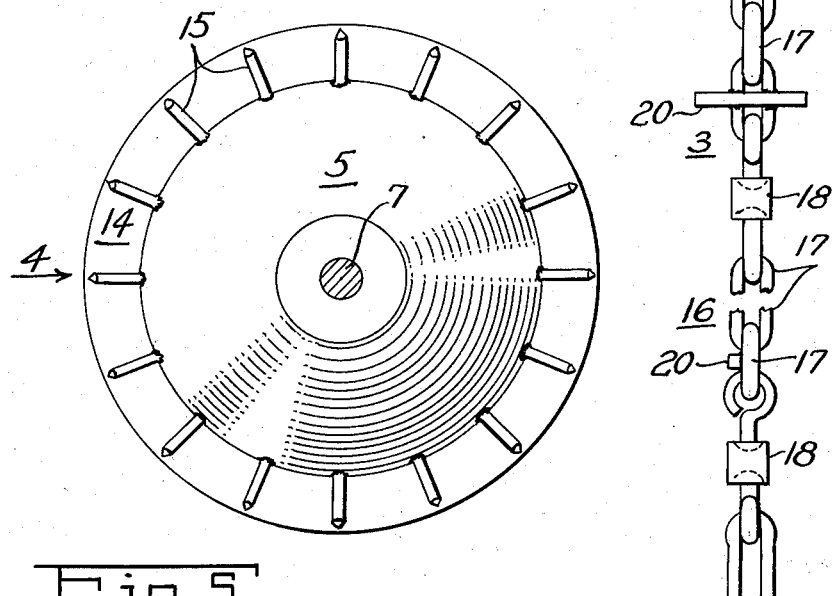
Fig. 5 is a view in section taken on line V—V of Fig. 4.

In order to cause the wheel 4 to track in such a way that the chain will remain reasonably normal to the direction of motion of the vehicle 1, the wheel is provided with a relatively sharp annular ring 14 at its periphery. Ring 14 extends outwardly of the wheel rim and is capable of sinking several inches into the soil depending on its radial width. As shown in Fig. 3, ring 14 causes the wheel to travel at an angle to the downslope whereby the length of chain between the wheel and the vehicle 1 is maintained substantially normal to the direction of motion to the vehicle.

In order to obtain positive rotational drive for the chain sections on which the harrow spikes are mounted, the wheel is provided with spikes or prongs 15 that extend radially outward of the wheel rim and at an angle thereto as shown. The spikes 15 cause the wheel to rotate and thereby give positive rotational driving action to the chain sections, as will be explained infra.

The chain comprises a plurality of sections 16, composed of a plurality of links 17. The link sections are connected together by swivels 18. The clevis 10 is connected directly to a swivel 18 and that swivel in turn is connected by a clevis 19 to the first link 17 of the chain as shown. The links of the various sections of the chain may be provided with spikes or harrow teeth 20 that extend across a link as shown with substantially equal portions on opposite sides of the link. The spikes may be welded or otherwise suitably secured to the links.

Links 17 may be formed of heavy round stock of about ⅞ inch in diameter more or less, as needs require. The inside length of a link may be about 3 to 3½ inches. Such a link is heavy and strong; however, the dimensions indicated are not intended to be limiting. There may be as many spikes per section of chain as desired. Each section between swivels may be ten to twelve feet long.

Figure 2:
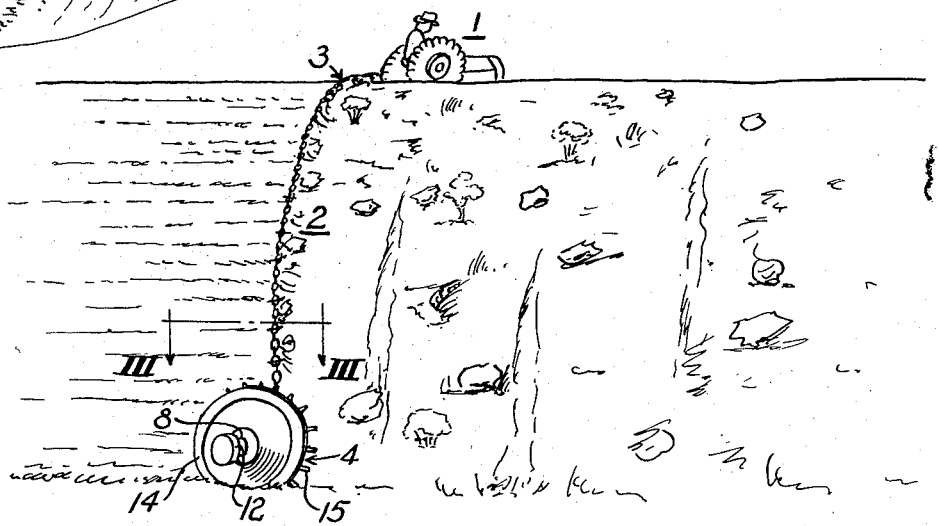
Fig. 2 is a view looking from the bottom towards the top of the bank or slope showing the soil conditioner as it is being dragged by a tractor.

When the soil conditioner is put to use as shown in Figs. 1 and 2, the wheel 4 is rolled down the bank from the roadway as far as it can go, which would be the total length of the chain. The tractor is then started forward to drag the chain and wheel behind it. The counterweight 12 is adjusted both as to magnitude and as to distance from the center of the rim of the wheel until the wheel rolls relatively freely on the rim. The counterweight should be such that the extension 7 and its clevis do not drag too heavily on the ground. It is preferable that the extension 7 and its clevis remain clear of the ground.

The counterbalancing having been adjusted, the wheel and the chain are dragged by the tractor as it moves along the roadway or bank. The sharp ring on the wheel rim will dig into the ground and cause the wheel to take an angle of travel such as shown in Fig. 3; since the wheel tends to run away from the tractor in distance, the effect is to put more tension on the chain and keep it more normal to the line of travel of the tractor or the vehicle. The spikes or prongs 15 dig into the ground and cause the wheel to turn or rotate. As the wheel travels forwardly, a rotational driving force is imparted to the chain so that the various swiveled sections will rotate about their longitudinal axes. As the chain sections rotate, the harrow spikes thereon dig into the ground and harrow the soil, while at the same time the chain will uproot the shrubs and brush. If the chain strikes a solid abutment of any kind, it will be dislodged from it because of the fact that the chain sections rotate.

Having thus described the invention, it will be apparent to those of ordinary skill in the art to which the invention pertains that various modifications and changes may be made in the illustrated embodiment without departing from either the spirit or the scope of the invention.

Therefore what is claimed as new and desired to be secured by Letters Patent is:

1. The combination with a drag chain for clearing shrubs and brush from a slope, the chain comprising sections connected by swivels, the lead end of the chain being provided with means for coupling the same to a tractor, of a wheel coupled to the opposite end of the chain, said wheel having an arm extending outwardly from the center of one side thereof which is provided with means to which the trailing end of the chain is coupled, an annular relatively sharp ring on the wheel that projects radially outward from the rim thereof and a plurality of spaced prongs on the periphery of said wheel located between said annular ring and arm to which the drag chain is attached, and a counterweight arm extending outwardly from the center of the wheel on the side opposite that from which the first arm extends.

2. The combination as in claim 1 in which the chain sections are provided with spikes disposed at substantially a right angle to the length of the respective sections.

3. The combination as in claim 1 in which the counterweight arm comprises telescoping members, one of which is fixed to the wheel and the other is slidable relative to the fixed member and the slidable member is provided with a weight at its outer end.

4. The combination as in claim 3 in which the magnitude of the weight is adjustable.

5. The combination with a drag chain for clearing shrub brush growth from slopes, the chain comprising sections connected together by swivels, the lead end of said chain being provided with means for coupling the same to a vehicle, of a wheel coupled to the opposite end of the chain, said wheel having an arm extending outwardly from the center of one side thereof and provided with means to which the trailing end of the chain is coupled, said wheel having an annular relatively sharp ring extending radially outward from the rim thereof and a plurality of spaced prongs extending radially outward of the rim and at an angle to said ring, said wheel having an arm extending outwardly from the center thereof on the side opposite that to which the first mentioned arm is attached and provided with a counterweight sufficient to cause the wheel to rotate substantially on its rim.

6. A wheel for a drag chain, said wheel having on one side an arm projecting outwardly from the center thereof and provided with means to which a drag chain may be attached, said wheel having an annular relatively sharp ring at the side of its periphery opposite the side from which said arm extends, a plurality of spaced radially extending prongs disposed around the periphery of the wheel at locations between said ring and said arm, the ring maintaining the wheel on course and the prongs causing the wheel to turn when the same is dragged by the chain.

7. A wheel for a drag chain for clearing brush growth on slopes, said wheel having on one side an arm projecting outwardly from the center thereof and provided with means to which a drag chain may be attached, said wheel having an annular relatively sharp ring at its periphery that extends radially outward of the periphery and a plurality of spaced radially extending prongs disposed around the periphery of the wheel, said prongs being spaced from each other and disposed at an angle to the ring, the ring maintaining the wheel on course when dragging by a vehicle and the prong causing the wheel to rotate.

8. A wheel as in claim 6 in which the side of the wheel opposite said arm is provided with a counterweight carried by and projecting outwardly from the center of the said wheel side.

9. A wheel as in claim 7 in which the side of the wheel opposite said arm is provided with a counterweight carried by and projecting outwardly from the center of the wheel and that means are provided for adjusting the distance of the counterweight from the wheel and the magnitude of the weight.

References Cited in the file of this patent

UNITED STATES PATENTS 1,897,820  Pitchford _____ Feb. 14, 1933

FOREIGN PATENTS 463,130  Germany _____ July 24, 1928